United States Patent [19]

Camp

[11] 4,280,116
[45] Jul. 21, 1981

[54] DECELERATION ALERT SYSTEM

[76] Inventor: Richard H. Camp, P.O. Box 62, Haines, Oreg. 97833

[21] Appl. No.: 923,957

[22] Filed: Jul. 12, 1978

Related U.S. Application Data

[63] Continuation-in-part of Ser. No. 567,162, Apr. 11, 1975, abandoned, and a continuation-in-part of Ser. No. 742,663, Nov. 11, 1976, abandoned.

[51] Int. Cl.³ .............................................. B60Q 1/26
[52] U.S. Cl. .................................. 340/66; 200/61.89; 307/10 R; 315/79; 340/71
[58] Field of Search ..................... 340/52 R, 52 H, 62, 340/66, 67, 71, 669; 307/10 R, 118, 120, 121; 200/61.89; 180/105 E, 282; 315/79, 80

[56] References Cited

U.S. PATENT DOCUMENTS

| 3,273,552 | 9/1966 | Plath | 340/66 |
| 3,304,381 | 2/1967 | McAnespey | 340/71 |
| 3,304,540 | 2/1967 | McAnespey | 340/71 |
| 3,336,450 | 8/1967 | Rainer | 340/66 |
| 3,676,844 | 7/1972 | Hendrickson | 340/66 X |
| 3,711,828 | 1/1973 | Hawkins | 340/66 |
| 4,034,338 | 7/1977 | Bevilacqua | 340/66 |

Primary Examiner—John W. Caldwell, Sr.
Assistant Examiner—Joseph E. Nowicki

[57] ABSTRACT

A control and signaling apparatus comprising a double acting switch having a conducting barrel and a spring loaded pin engageable with the barrel and being conducting in either of two preselected positions and a control circuit operable to selectively light any of three signal lamps in response to mechanical operation of motor vehicle controls.

5 Claims, 2 Drawing Figures

DECELERATION ALERT SYSTEM

REFERENCE TO OTHER APPLICATIONS

This application is a continuation in part of my prior application, Ser. No. 567,162, filed Apr. 11, 1975, now abandoned, and a continuation-in-part of application, Ser. No. 742,663 filed Nov. 11, 1976, now abandoned.

FIELD OF INVENTION

The present invention relates to electric control and signaling circuit for vehicles, and more particularly to a solid-state electric control and signaling apparatus, controlled by a double acting switch arrangement operable to indicate a plurality of vehicle operating conditions.

DESCRIPTION OF THE PRIOR ART

Means commonly used and employed for control and signaling indicating devices on moving vehicles, such as motor vehicles, have commonly included electromagnetic switches having a freely slidable torpedo member carried in a suitable casing and various contact connections. It has been found that the sensitivity, size and fragility of these electromagnetic structures limit their effectiveness in vehicles.

Means commonly used and employed to control or indicate acceleration have also included complicated floating electromagnetic switches, as well as complex electromagnetic circuits. As above, the electromagnetic switches, while having technical simplicity over electronic accelerometers, are affected by attitudes and shocks caused by operation of the vehicle.

Accordingly, it is an object of the present invention to provide an electronic control and signaling switch for vehicles which may control and signal responses to a plurality of alternate signal inputs. These signal inputs may include acceleration, braking, and inertial deceleration.

It is an object of this invention that the aforesaid electronic control and signaling apparatus be operable to activate servomechanisms, instruments, control mechanisms including indicator lights and similar functions.

It is a further object of this invention that the aforesaid control and signaling apparatus be of an integrated and internally integrated feedback design for controlling the several, alternate functions.

It is another object of this invention to provide a simplified acceleration switch operable in a vehicle and that the aforesaid acceleration switch be adapted to the present controlling apparatus as a means for providing controlling indicator lamps and the like.

It is a further object of this invention to provide the control and signaling apparatus of the aforesaid design, which may be readily adapted to moving structures other than vehicles, such as belts, overhead cranes and the like.

These and other objects shall become apparent from the description following, it being understood that modifications may be made without affecting the teachings of the invention here set out.

SUMMARY OF THE INVENTION

The control and signaling apparatus comprises a chassis grounded double acting switch having one of its contactors in communication with a first semiconductor diode interconnected with the base of a first transistor, the emitter of the first transistor being connected to a suitable source of power through the vehicle ignition switch, and its collector connected to a first signal lamp, a second semiconductor diode in communication with the other contactor of the double acting switch and the base, the emitter of which is connected to a source of power through the vehicle ignition switch and the collector being connected to the emitter of a third transistor having its collector connected to a second signal light and its base interconnected through a third diode and a chassis ground; a third indicator light connected through a switch to a suitable source of power and to chassis ground through a fourth diode disposed between the third diode and chassis ground, a fifth diode being disposed between the base of the first transistor and the switch contactor, a braking switch connected to a power source. When the braking switch is engaged with its contactor, a positive potential is transmitted through the fifth diode, thereby reverse biasing the first transistor so that the first light becomes non-conducting.

The double acting switch comprises an electrically conducting tubular barrel having a contactor mounted therein, the interior of the barrel having insulating layer therein, a first terminal disposed in the insulating layer extending through the barrel wall on the side opposite the contactor, the first terminal being isolated from the barrel wall, an electrically non-conducting cap threadably engaged with one of the terminal ends of the barrel, a second contactor terminal in the cap, a slidable pin in the barrel coextensive in length therewith, a shoulder portion on the pin distally from one of the terminal ends of the pin, the insulating layer in the barrel having a first portion of one diameter and a second portion of lesser diameter, a spring carried by the pin disposed between the cap and the shoulder portion of the pin.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
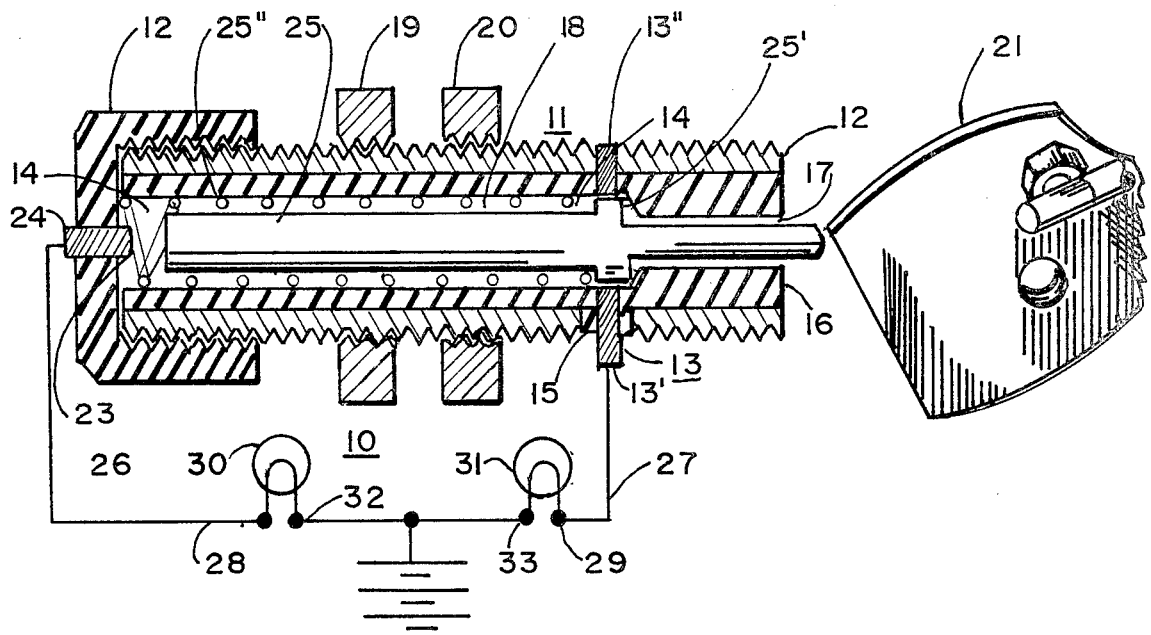
FIG. 1 is a cross sectional view of the double acting switch of this invention connected to respective signal lamps to indicate deceleration and acceleration modes of a motor vehicle in response to movement of a slide pin contactor by the carburetor rocker arm of the vehicle.

Referring to the drawings, and more particularly to the FIG. 1, the accelerator alert system including double acting switch mechanism of the invention is shown to advantage and generally identified by the numeral 10. The switch, shown at 11, includes a tubular barrel portion 12 fabricated from a suitable electrically conducting material. In fabricating the barrel portion 12, it has been found to advantage to frictionally seat an upstanding pin 13 in a hole 14 bored into one side of the barrel portion 12, permitting the pin 13 to extend through a hole 15 of larger diameter in the opposite wall of the barrel 12, after which an insulating material 16 is cast in place in the barrel portion 12 and about the pin 13 in the hole 15. The insulating material 16 is then bored to a preselected diameter generally shown at 17 and counter bored to a preselected larger diameter 18 to a selected depth in the barrel portion 12. The counter bore extends beyond the pin 13 so that a portion of the pin 13 is removed, leaving a terminal portion 13' extending through the barrel portion 12 in the insulating material 16 and a contactor portion 13'' in communication with the conducting barrel portion 12. It is to be understood that the barrel portion 12 may be fabricated in any of a variety of other manners to provide terminal portion 13' and contactor portion 13'' suitably mounted in the barrel portion 12. The barrel portion may be externally threaded either throughout its length or, alternatively, only for a portion of its length. It has been found convenient to provide mounting nuts 19 and 20 for mounting and juxtapositioning the barrel 12 to a commonly known carburetor bracket (not shown) of an automotive vehicle. The barrel portion 12 may then limit the travel of a commonly known accelerator rocker arm, a fragmentary portion of which is shown at 21. The barrel portion 12 being mounted in the bracket associated with the carburetor is grounded to the chassis. Similarly, the contactor pin 13'' in the barrel portion 12 is in communication with the chassis ground. This is opposite the arrangement shown in my U.S. Pat. No. 3,761,875, which teaches a single acting switch arrangement.

The double acting switch 11 of this invention is provided with a cap 22 threadably engaged in one of the terminal ends of the barrel portion 12. The cap 22 is provided with a contactor 23 having a terminal pin 24. It has been found to advantage to fabricate the cap from an insulating or nonconducting material to electrically isolate the contactor 23 from the cap 22, and, consequently, from the chassis grounded barrel portion 12.

The switch 11 is provided with an actuating pin 25 disposed in the barrel portion 11. The actuating pin 25 includes a shoulder portion 25' disposed distally from the terminal ends of the actuating pin 23. A spring 25'' about the actuating pin 25 and having one of its terminal ends engaging the cap 22 and its opposite terminal end engaging the shoulder portion 25' of the actuating pin 25 thereby tends to urge the pin 25 forwardly so that the shoulder portion 25' is in communication with the contactor pin 13'' and the terminal pin 13' in the barrel portion 12. In this condition, the terminal pin 13' is conducting to chassis ground through the barrel 12, pin 13' and the mounting bracket. The rocker arm 21, when at rest against the barrel portion 12, tends to urge the actuating pin 25 rearwardly into engagement with the contact 23 and the shoulder portion 25' of the actuating pin 25 is moved out of engagement with terminal pin 13' and the contactor pin 13''. In this condition the contact 23 is chassis grounded through the actuting pin 25 to the rocker arm 20 of the carburetor. Thus, the switch may be used in an acceleration alert system to indicate either of two operating modes hereinafter described.

Leads 26 and 27 are interconnected between the respective terminal 12' and the contact 22 and one of the terminals 28 and 29 of respective indicating lamps 30 and 31. When the rocker arm 21 is at rest against the actuating pin 25, the pin 25 is urged rearwardly into engagement with the contact 23, permitting current to flow through the lamp 30 from the rocker arm 21, the actuating pin 25, the contact 23, the terminal 24 and the lead 26 to the voltage source 32 of the lamp 30. This would indicate a deceleration mode, which for convenience, will be hereinafter called the "amber mode."

Alternatively, when the rocker arm 21 is moved forwardly in response to acceleration of the vehicle, as it is shown in the FIG. 1, the actuating pin 25 is urged forwardly by the spring 25'' and the shoulder portion 25' is in engagement with the terminal 13' and the contact 13'' in the barrel portion 12 permitting current to flow from the chassis grounded barrel portion 12, the contact 13'', the terminal 13', the lead 27 through the lamp 31 to the voltage source 34. In this condition, the lamp indicates an acceleration or operating mode, which, for convenience, will be identified as the "green mode." Therefore, the acceleration alert system 10 of the present invention is responsive to a plurality of automotive operating modes, each having a predetermined behavior affected by acceleration and deceleration. In order to indicate a braking mode in addition to the foregoing modes described, it is desirable to provide means effective to cancel the acceleration or deceleration indicators so that only the braking mode may be indicated. The more complex circuit necessary to indicate acceleration, deceleration and braking modes is shown in the FIG. 2, which, however, shows the double acting switch 11 of this invention by the accepted symbol therefor at S-2.

Figure 2:
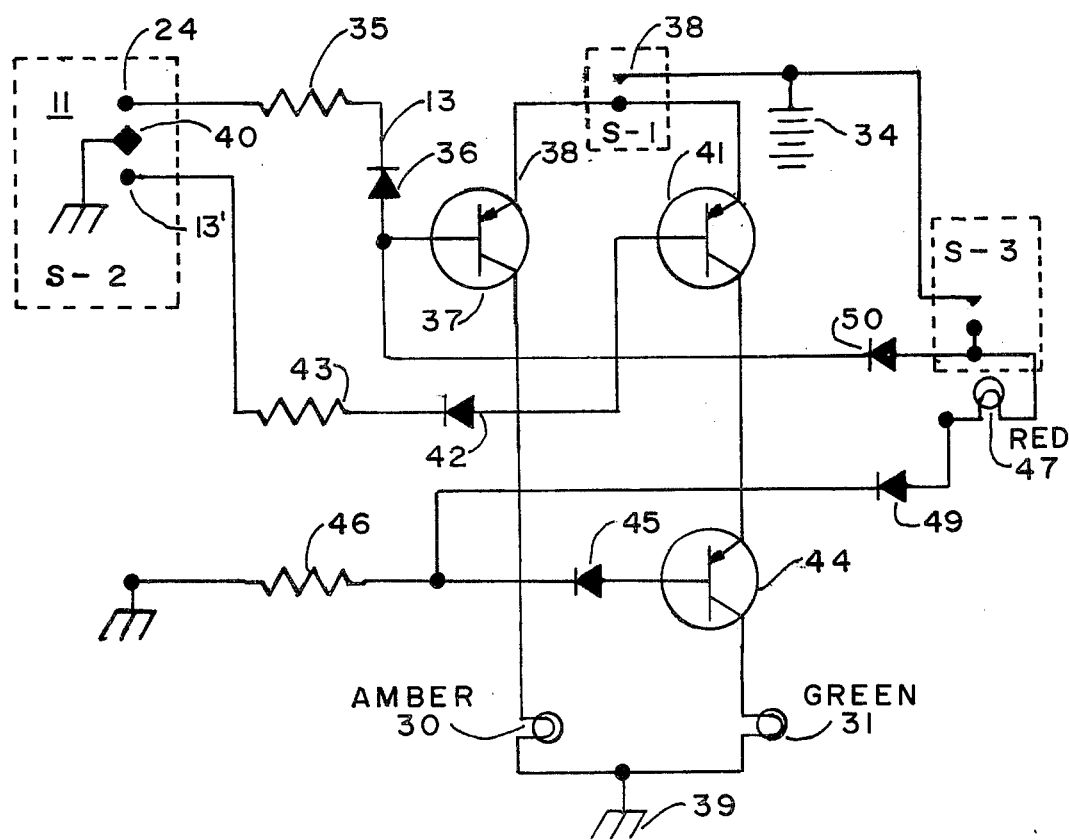
FIG. 2 is a schematic diagram of the control and signaling apparatus of the invention to indicate deceleration, acceleration and braking modes of a motor vehicle.

Referring now to the FIG. 2, the circuit is connected to a voltage source 34 through the ignition switch S-1, an automotive vehicle.

The circuit of the "amber" or deceleration mode is connected to one of the terminals such as the terminal 24 of a double acting switch S-2 such as switch 11 earlier described. The circuit comprises a resistor 35 of suitable resistance for a pre-selected current for the circuit interconnected by a lead 13 to the terminal 24 of the switch S-2 and a semiconductor diode 36 in communication with the base of a commonly known PNP transistor 37 having its emitter connected to the automotive ignition switch at 38 and its collector connected to an amber lamp such as 30, the lamp 30 being grounded to chassis at 39. The diode 36 is forwardly biased when the automotive switch is "on" and the double acting switch leaf 40 is in contact with the terminal 24, there being a potential difference between the emitter and the collector of the transistor 37, current will flow through the lamp 30. When the leaf 40 is not in contact with the contactor of the terminal 24, there is no potential difference between the collector and emitter of the transistor 37 because of the absence of input potential at the base.

The circuit of the "green" or acceleration mode is connected to the opposite terminal of switch S-2 such as by terminal portion 13' of a dourble acting switch 11. The base of a second transistor 41 is connected through a forwardly biased diode 42, a resistor 43, and the terminal portion 13' to chassis ground. The transistor 41 is connected by its emitter to the power source through the ignition switch 38. The collector of the transistor 41 is connected to the emitter of a third transistor 44. The transistor 44 is connected through its base to chassis ground through a diode 45 and a resistor 46. The collector of the transistor 44 is connected to one of the terminals of the lamp 31, which has its other terminal connected to chassis ground. The circuit of the "green" mode is operable when the leaf 40 is in contact with the terminal 13' in response to the leaf or pin being urged forwardly by the spring of the double acting switch 11 when the rocker arm of the carburetor is articulated out of the path of the spring. The circuit being complete, the diode 42 is forwardly biased, which permits a potential differential in the transistor 42, permitting current to flow through the transistor to the lamp 31.

The circuit of the braking, or "red" mode, includes a switch S-3 connected to a power source and to one of the terminals of an indicating light 47. The opposite terminal of the light 47 is connected to chassis ground through a resistor 46 and a diode 49. During the braking operation the switch S-2 is normally engaged with the terminal 24 since the leaf 40 is urged rearwardly in response to movement of the carburetor arm as shown in the FIG. 1 for the switch hereinbefore taught by this invention. Thus, the "amber" mode would normally be indicating by the lamp 30. In order to cancel operation of the lamp 30, a positive potential is transmitted from the switch S-3 in communication with the positive power source through a diode 50 to the base of transistor 37. In this condition, there is no potential difference across the transistor 37, and the lamp 30 can not light or indicate an operational mode.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. In a decelerator alert system for vehicles operable to indicate acceleration and deceleration modes of vehicle operation, the combination of a double acting switch and a pair of respective indicating lamps each having a terminal end connected to a suitable source of power, said double acting switch comprising a tubular barrel portion including an outer wall of electrically conducting material and an inner wall of insulating material, said inner wall including a first portion being of a selected diameter and a second portion being of a larger diameter, an upstanding contactor suitably fastened in the outer wall and extending interiorly through the said inner wall of insulating material, an upstanding terminal in the barrel walls opposite said contactor, said upstanding terminal being insulated from said outer conducting wall of said barrel, said contactor and said terminal being disposed at the terminal end of said second portion adjacent said first portion of the inner wall, a cap threadably carried by said barrel at the terminal end of said barrel adjacent said second portion of said inner wall, a cap contactor mounted in said cap being insulated from said cap so that the cap contactor and the cap are electrically isolated from each other, a pin slidably carried in said inner wall of said barrel, said pin having a shoulder portion distally from a terminal end of said pin, a spring carried by said pin disposed between said cap and said shoulder of said pin being operable to urge said pin in the direction opposite said cap, said terminal of said barrel being in communication with another terminal of one of said lamps, said cap contactor being in communication with another terminal of the other of said lamps, said double acting switch being mounted to the chassis of a motor vehicle and being operable to limit the travel of a rocker arm of a commonly known carburetor, said rocker arm being operable to urge said pin rearwardly to engage said cap contactor.

2. The apparatus of claim 1 wherein said cap is fabricated from an electrically non-conducting material.

3. In a deceleration alert system for vehicles operable to indicate acceleration, deceleration and braking operating modes of vehicle operation, the combination of a double acting switch and a signal indicating circuit comprising a first transistor having an emitter connected to a positive power source through an ignition switch of an automotive vehicle, a base of said first transistor being connected to chassis ground through a first semi-conductor diode connected to a first of two contact terminals of said double acting switch, a collector of said first transistor being connected to one terminal of an indicating lamp having its opposite terminal connected to chassis ground, a second transistor having an emitter connected to a positive power source through an ignition switch, a base of said second transistor being connected to chassis ground through a second semi-conductor diode connected to the second of the two contact terminals of said double acting switch, a collector of said second transistor being connected to one terminal of a second indicating lamp having an opposite terminal connected to chassis ground, a brake switch connected to a positive power source and having a contact connected to one terminal of a third lamp and to the base of the first transistor through a third semi-conductor diode, an opposite terminal of said third lamp being connected to chassis ground.

4. The circuit of claim 3 wherein the collector of said second transistor is connected to an emitter of a third transistor, a base of said third transistor being connected to chassis ground through a fourth semi-conductor diode and a collector of said third transistor being connected to one terminal of said second lamp and the opposite terminal thereof connected to chassis ground, and wherein the said opposite terminal of said third lamp is connected to chassis ground through a fifth diode.

5. The circuit of claim 3 wherein said double acting switch comprises a tubular barrel portion including an outer wall of electrically conducting material and an inner wall of insulating material, said inner wall including a first portion being of a selected diameter and a second portion being of a larger diameter, an upstanding contactor suitably fastened in the outer wall and extending interiorly through the said inner wall of insulating material, an upstanding terminal in the barrel walls opposite said contactor, said upstanding terminal being insulated from said outer conducting wall of said barrel, said contactor and said terminal being disposed at the terminal end of said second portion adjacent said first portion of the inner wall, a cap threadably carried by said barrel at the terminal end of said barrel adjacent said second portion of said inner wall, a cap contactor mounted in said cap being insulated from said cap so that the cap contactor and the cap are electrically isolated from each other, a pin slidably carried in said inner wall of said barrel, said pin having a shoulder portion distally from a terminal end of said pin, a spring carried by said pin disposed between said cap and said shoulder of said pin being operable to urge said pin in the direction opposite said cap, said double acting switch being mounted to the chassis of a motor vehicle and being operable to limit the travel of a rocker arm of a commonly known carburetor, said rocker arm being operable to urge said pin rearwardly to engage said cap contactor.

* * * * *